(12) United States Patent
Klowak

(10) Patent No.: US 7,116,230 B2
(45) Date of Patent: Oct. 3, 2006

(54) ASSET LOCATION SYSTEM

(75) Inventor: Greg Klowak, Kanata (CA)

(73) Assignee: VeriChip Corporation, Ottowa (CA)

( * ) Notice: Subject to any disclaimer, the term of this patent is extended or adjusted under 35 U.S.C. 154(b) by 251 days.

(21) Appl. No.: 10/890,670

(22) Filed: Jul. 14, 2004

(65) Prior Publication Data
US 2006/0012480 A1  Jan. 19, 2006

(51) Int. Cl.
  *G08B 13/14* (2006.01)
(52) U.S. Cl. .............. 340/572.1; 340/539.1; 340/5.92; 700/213; 705/22
(58) Field of Classification Search ............. 340/572.1
   See application file for complete search history.

(56) References Cited

U.S. PATENT DOCUMENTS

| | | | |
|---|---|---|---|
| 4,796,209 A | 1/1989 | Burk | |
| 4,920,488 A | 4/1990 | Filley | |
| 5,873,070 A | 2/1999 | Bunte et al. | |
| 5,959,568 A * | 9/1999 | Woolley | 342/42 |
| 6,057,756 A | 5/2000 | Engellenner | |
| 6,456,239 B1 * | 9/2002 | Werb et al. | 342/463 |
| 6,600,418 B1 | 7/2003 | Francis et al. | |
| 6,825,763 B1 * | 11/2004 | Ulrich et al. | 340/539.1 |
| 6,972,682 B1 * | 12/2005 | Lareau et al. | 340/568.1 |
| 2003/0101108 A1 | 5/2003 | Botham et al. | |
| 2003/0130912 A1 | 7/2003 | Davis, Jr. et al. | |

FOREIGN PATENT DOCUMENTS

| | | |
|---|---|---|
| CA | 2270958 | 5/1998 |
| CA | 2425324 | 4/2002 |

\* cited by examiner

*Primary Examiner*—Daniel Wu
*Assistant Examiner*—George Bugg
(74) *Attorney, Agent, or Firm*—Michael A. Bondi

(57) ABSTRACT

An asset location system comprising a plurality of location tags, each having: a location tag transmitter for controlled range transmission of a location identifier; a plurality of asset tags, each being affixed to an asset and each having: a receiver for receiving a location identifier from any of the location tags; a memory for storing at least an asset identifier and a location identifier; a transmitter for transmitting an asset signal, the asset signal including at least the asset identifier and the received location identifier; and an asset location retrieval unit, the retrieval unit having: a receiver for receiving the asset signal from any of the asset tags; a memory; a power unit; and an output means for outputting asset locations based on the received asset signal from any of the plurality of asset tags.

28 Claims, 5 Drawing Sheets

ASSET LOCATION SYSTEM

FIELD OF THE INVENTION

The present invention deals with a system for locating assets and, in particular, to a system in which an asset periodically transmits its location and an asset identifier to a portable receiving unit.

BACKGROUND TO THE INVENTION

In many situations, finding an asset within a facility can be a cumbersome and time-consuming exercise. Worker productivity is reduced by requiring the worker to search for the asset. Further, the benefits of a certain piece of equipment or asset are reduced by having it under-utilized, thereby in many situations necessitating the purchase of more assets in order to offset this down-time.

In order to overcome the above inefficiencies, in some situations, facilities have installed asset tracking systems. An asset tracking system, as used herein, is defined as a real-time or near real-time system in which an asset location is continually updated. Such systems generally include means for locating an object in a facility through the attachment of an indicia to the object. Indicia include radio frequency tags. Such a system records the location of the object and the radio frequency tag is used to identify the location of the object. Receivers in each location typically convey identifiers from a tag to a centralized computer.

The problem with asset tracking is the cost of implementing the infrastructure required for this tracking. Each location needs to include a receiver for receiving signals from assets and this receiver needs to continually communicate with a centralized database in order to constantly know the location of assets.

Asset tracking is useful, for example, in warehouse situations where a large number of assets exist in a small area. The cost of implementing a number of receivers in this small area is sufficiently low that asset tracking is worthwhile. Situations with sufficiently high-valued assets can also justify the required infrastructure costs of an installed tracking system.

Asset tracking, however, is not worthwhile in situations where there are a relatively small number of assets in a large location. Such a location can include, for example, a hospital setting in which the location of pieces of equipment sometime need to be determined. In such a situation, the cost of implementing an asset tracking system can be prohibitive due to the infrastructure requirements of this system. Other illustrative examples are a) materials and/or equipment tracking in manufacturing facilities and b) goods tracking in a distribution centre.

An asset "location" system is a better solution for such an environment. An asset "location" system is a system in which an asset is periodically located and this information is stored on a database. One such system includes U.S. Pat. No. 6,600,418 to Francis et al. Francis teaches the use of a radio frequency identification tag (RFID) on both objects and in locations. A palette truck moving the objects includes an interrogator and a receiver which records both the location of the object and the object identification. Using the RFID tags on both location and the object, a database on the palette truck can store the location of an asset.

One problem with Francis is the use of an RFID tag for both the location and the object identification. RFID will identify an area of poorly controlled and poorly defined size and dimensions for the location of an object. Further, since both the object and the location uses RFID tags, it is possible that the palette truck in Francis will receive an identifier for the location from one tag which does not necessarily identify the correct location for the object identified by a second tag.

A second problem of Francis is that it requires interrogation, thus making the tags and markers more complicated and costly. Francis further does not disclose the period collection of data for the movement of assets since Francis assumes that these assets will be moved with a fork-lift truck and, therefore, the new asset location will be registered in the database.

Another tracking system includes U.S. Pat. No. 6,154,139 to Heller. Heller teaches the use of RF and IR to locate subjects. The system has asset tags which transmit both IR and RF to a dual technology receiver. This implementation limits the receiver to be within line of sight for the IR communication to function and provide location information. This, as a result, requires additional receivers to be installed to get IR location information and limits the function of the non-line of site receivers to only RF information. This system is not suitable for portable receivers due to the lack of location specific IR information since it is also an IR receiver. Therefore, it does not address the high infrastructure costs of fixed receivers in an asset tracking system.

Another tracking system includes U.S. Pat. No. 6,542,114 to Eagleson et al. Eagleson teaches the the use of LF transmit signposting, an asset tag with an LF receiver and RF transmitter, along with an RF receiver which is fixed into the facility infrastructure. Eagleson does not teach the use of a portable RF receiver and therefore also does not address the high infrastructure costs required to install a fully fixed network of receivers.

In situations such as in hospitals, schools, laboratories or other facilities in which objects can be moved by people, it is desirable, therefore, to have a low-cost system which can periodically be updated to indicate the location of assets and to do so accurately.

SUMMARY OF THE INVENTION

The present invention provides an asset location system in which the infrastructure costs are reduced compared to asset tracking systems. In the present system, a location tag (a controlled-range transmitter) is located at pre-determined locations. Each asset includes an asset tag affixed to it, the asset tag receiving location information from the location tag. The asset tag stores this location information and occasionally transmits its location and a unique identifier. Preferably, the asset tag transmits using radio frequency while the location tag transmits through a means that has properties that can be well controlled spatially such as infrared or low-frequency radio.

An asset location retrieval unit is periodically moved throughout the facility and includes a receiver for receiving signals from each of the asset tags. This information is stored and, preferably, is downloaded to a server which includes a searchable database. A user can then search for an asset and will know, from the database, the last location identified by the asset location retrieval unit.

In a hospital setting, the asset location retrieval unit can be affixed to a cart which would normally be transported around the facility. This could include, for example, a food or medicine cart. The asset location retrieval unit can alternatively be transported around the facility by a person, or other means. Once this cart is brought back to its original station, the retrieval unit can be connected to a network and information received during the cart's movement throughout the facility can be downloaded to the server. Alternatively, the asset location retrieval unit can download its collected data wirelessly when a wireless link is (or can be) established and location data needs to be reported.

The asset tag can include a clock (or timekeeping system) so that the duration can be measured and reported for any of a) the duration for which a location tag remains detected, b) the duration for which a location tag is the most-recently detected location tag, or c) the duration since a location tag was last detected.

The asset location retrieval unit may include the capability to analyze received data, discarding redundant information and/or prioritizing key information or performing other processing. The retrieval unit can also include a clock (or timekeeping system) so that received location data can be time-stamped. This way, the accuracy of duration information received from asset tags can be maintained, should time elapse before the retrieval unit data is transferred to the database.

The present invention, therefore, provides an asset location system comprising: a plurality of location tags, each of said plurality of location tags having a location tag transmitter for transmission of a location identifier; a plurality of asset tags, each of said plurality of asset tags being affixed to an asset and each of said plurality of asset tags having: an asset tag receiver for receiving a location identifier from any of said plurality of location tags; a memory for storing at least an asset identifier and a location identifier received by said asset tag receiver; and an asset tag transmitter for transmitting an asset signal, said asset signal including at least said asset identifier and said received location identifier; and an asset location retrieval unit, said retrieval unit having: a retrieval unit receiver for receiving said asset signal from any of said plurality of asset tags; a memory for storing any said received asset signal received from any of said plurality of asset tags; a retrieval unit power unit for providing power to said retrieval unit; and an output means for outputting asset locations based on said received asset signal from any of said plurality of asset tags.

BRIEF DESCRIPTION OF THE DRAWINGS

The present invention will be better understood with reference to the drawings in which.

DETAILED DESCRIPTION OF THE DRAWINGS

Figure 1:
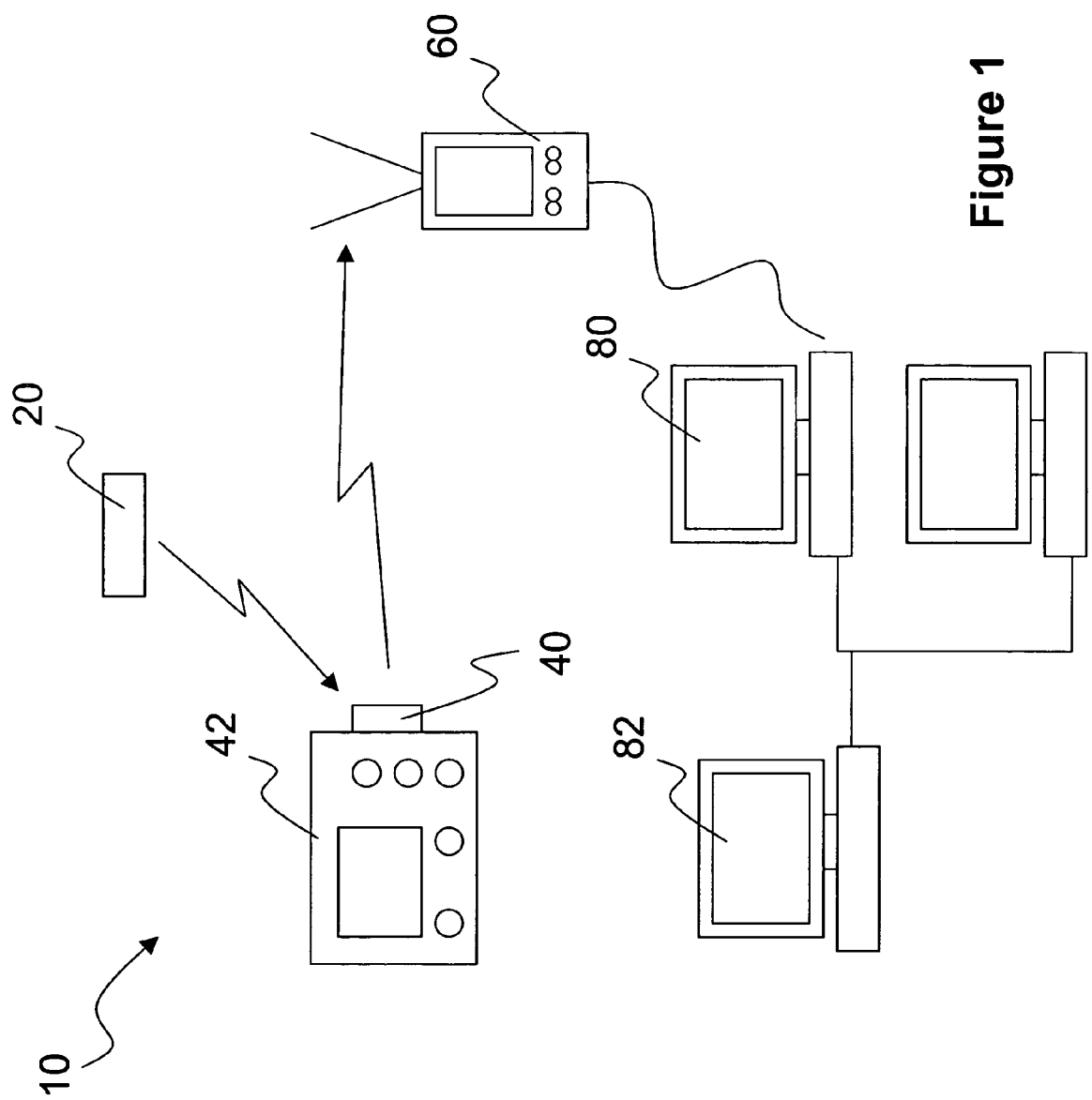
FIG. 1 is a block diagram of the components of an asset location system.

Reference is now made to FIG. 1. FIG. 1 shows a preferred asset location system 10.

A location tag 20 is affixed at various locations throughout a facility. Location tag 20 communicates through a controlled-range transmission with an asset tag 40 affixed to an asset 42. As described in more detail below, asset tag 40 includes a receiver for receiving a transmission from location tag 20 and further includes a transmitter for sending a signal periodically.

An asset location retrieval unit 60 is transported throughout the facility and receives a signal from asset tag 40 and records this signal. Location retrieval unit 60 can periodically be connected to a client machine 80 which transmits the data from location retrieval unit 60 to a server 82. Alternatively, location retrieval unit 60 can be connected directly to the server 82.

Figure 2:
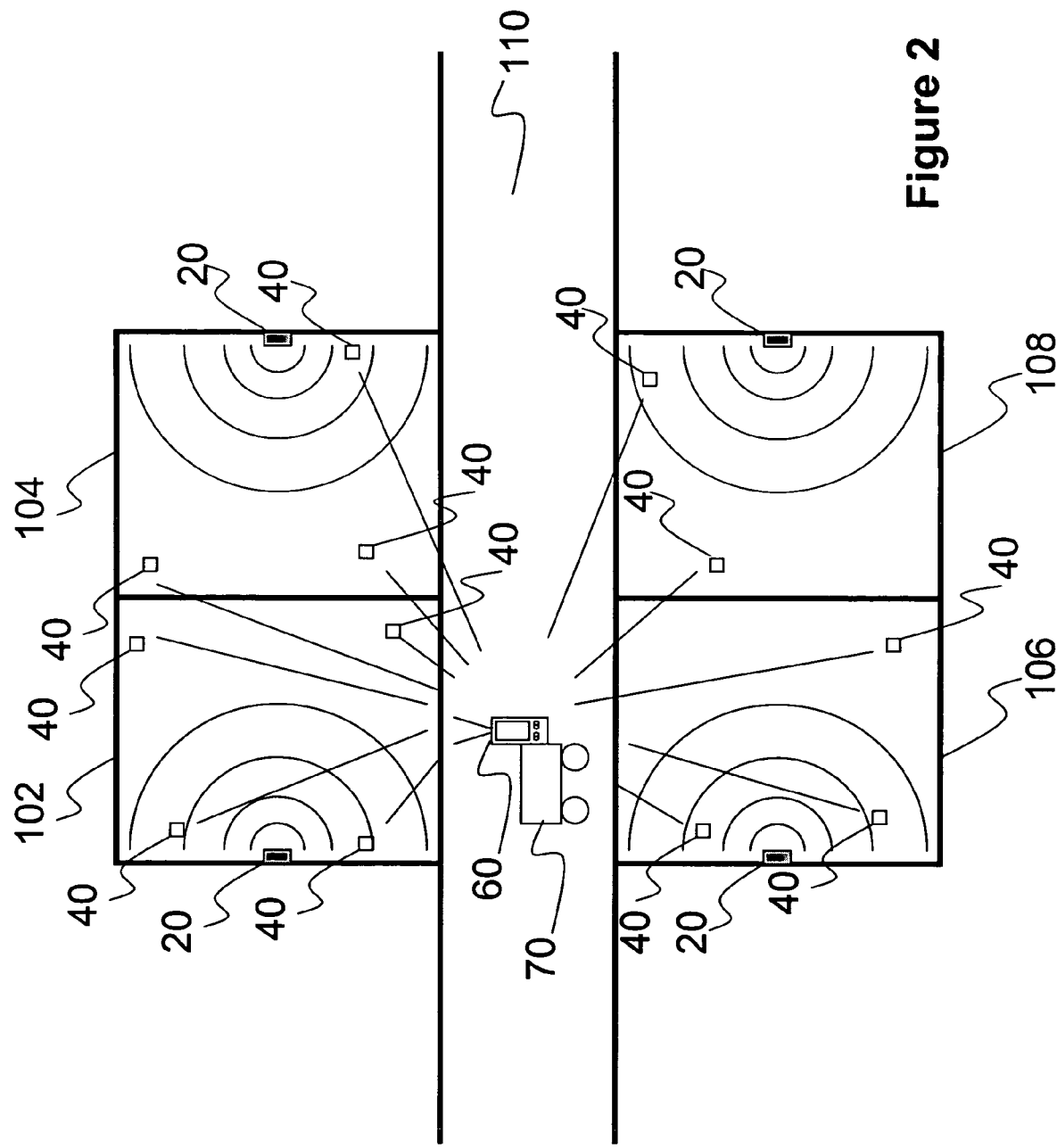
FIG. 2 is a schematic plan view of an example of the implementation of an asset location system according to the present invention.

Reference is now made to FIG. 2. FIG. 2 shows an example layout of the present system. In the example of FIG. 2, four rooms, 102, 104, 106 and 108, are shown. Rooms 102 and 104 are separated from rooms 106 and 108 by a hallway 110.

In the example of FIG. 2, a location tag 20 is located in each of rooms 102, 104, 106 and 108. In a preferred embodiment, location tag 20 is an infrared transmitter, therefore its signal does not penetrate the walls of any of the rooms.

A number of assets are located in each room, each asset having an asset tag 40 associated with it. In the example of FIG. 2, room 102 has four assets located within it, whereas room 108 has two assets located within it. Each asset tag 40 receives a signal from location tag 20 and periodically transmits a signal including location and asset identifier information. This signal, for example, is radio frequency signal.

The signal from asset tag 40 preferably can penetrate walls, ceilings and floors, but must also comply with regulations regarding the transmission of radio frequency, especially in sensitive areas such as hospitals.

An asset location retrieval unit 60 is transported through an area to which the signal from asset tag 40 can be received. The asset location retrieval unit 60 records the signal from asset tag 40, wherein the signal includes at least the location of the asset and an asset identifier.

In the example of FIG. 2, asset location retrieval unit 60 is associated with a trolley 70 which might normally be transported down hallway 110. Such trolleys, for example, can include medicine or food carts in hospital settings.

As will be appreciated by one skilled in the art, since the signal from asset tag 40 can penetrate walls within a certain range, asset location retrieval unit 60 does not need to enter the room in which asset 42 is located.

In alternative embodiments to the example of FIG. 2, location tags 20 can be located within hallway 110 and do not need to be in every room. An asset 42, when passing a location tag 20 in hallway 110 will record the location and, if no further signals are received, then asset 42 will consider the signal received from location tag 20 within hallway 110 as the last location the asset 42 was in. This allows a user to set zones, or barriers, through which the asset records that it has passed and may make the implementation of this system more cost-effective in some cases where each room does not need to be uniquely marked. Alternatively, shorter-range location tags and/or additional location tags may be used to provide finer resolution data if required to meet the needs of an application.

Figure 3:
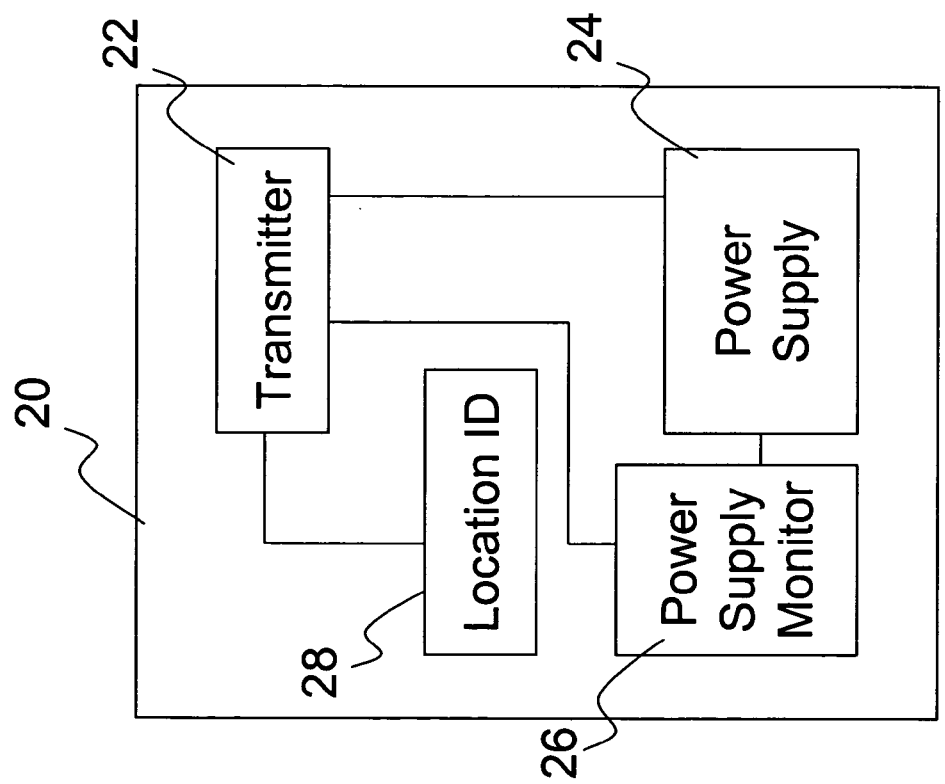
FIG. 3 is a block diagram of the components of a location tag.

Reference is now made to FIG. 3. Location tag 20 provides a controlled-range signal identifying the proximity of location tag 20. In a preferred embodiment, location tag 20 is a battery-operated infrared tag. However, as will be appreciated by one skilled in the art, location tag 20 may be connected to a building's power or have other power sources and may also use other controlled-range communication means, including controlled-range radio frequency such as Bluetooth or low frequency inductive communication.

Location tag 20 preferably therefore, includes a transmitter 22 which provides controlled-range transmission. Transmitter 22 is preferably an infrared diode (or set of diodes) as is well know to those skilled in the art.

Location tag 20 further includes a power supply 24 which, as indicated above, is preferably a battery source, but can also be numerous other power sources including the building's power or, in some cases, where the tag is installed in the room in which lights are constantly on, a photocell. However, preferably, power supply 24 is an alkaline or lithium battery, or other battery that is capable of a long operating life when consumed sparingly.

If power supply 24 is a battery, in a preferred embodiment location tag 20 also includes a power supply monitor 26. Power supply monitor 26 monitors the battery level and this is transmitted by transmitter 22. By transmitting the battery level found by power supply monitor 26, the battery status of each of location tags 20 within a facility can be easily tracked and the batteries changed when needed.

Location tag 20 further includes a unique location identifier 28. This location identifier can simply be a unique ID for location tag 20. Alternatively, location identifier 28 can be programmed into location tag 20. In either case, the location ID is recorded in a database along with the actual location of the tag.

In operation, location tag 20 preferably transmits, through transmitter 22, location identifier 28 and a battery level as determined by power supply monitor 26. Alternatively, if no power supply monitor 26 is included, then transmitter 22 merely transmits location identifier 28.

In a preferred embodiment, the transmitter 22 sends the location identifier 28 and, possibly, the power (or battery) level (or status) periodically. This is preferably controlled using a processor (not shown). The period for transmission is set based on the likelihood that an asset passing through a specific area will receive and record the controlled-range signal sent by transmitter 22. In one embodiment contemplated by the inventors, this is set to three seconds. However, this transmission period can be set higher or lower depending on the requirements of the specific application. For example, if sites are covered with sign-posting (meaning that only a limited number of key facility locations are marked by location tags), the period could be set to repeat transmissions more frequently to ensure the detection of a location signal by a passing asset tag.

Location tag 20 is preferably mounted in a location so that asset tags within that location, or passing through that location, will clearly detect the signal from an asset location tag 20. This could be high on a wall, over doorways, on ceilings or in other locations known to those skilled in the art. Asset location tag 20 can be mounted using any known mounting means including adhesive, screws, hooks, mounting brackets or other mounting technologies known to those skilled in the art.

Preferably, location tag 20 is encased in a plastic cover that provides some protection for the components. This could include securing the batteries within location tag 20 to ensure that the location tag 20 is not treated as a free battery dispenser.

Since location tag 20 is preferably battery-powered, battery life is a design consideration. The brightness of an infrared transmitter or the power of a short-range radio frequency transmitter should be set to provide optimal battery performance while still providing assets with a location identifier that can be read when an asset enters or passes through a location.

Figure 4:
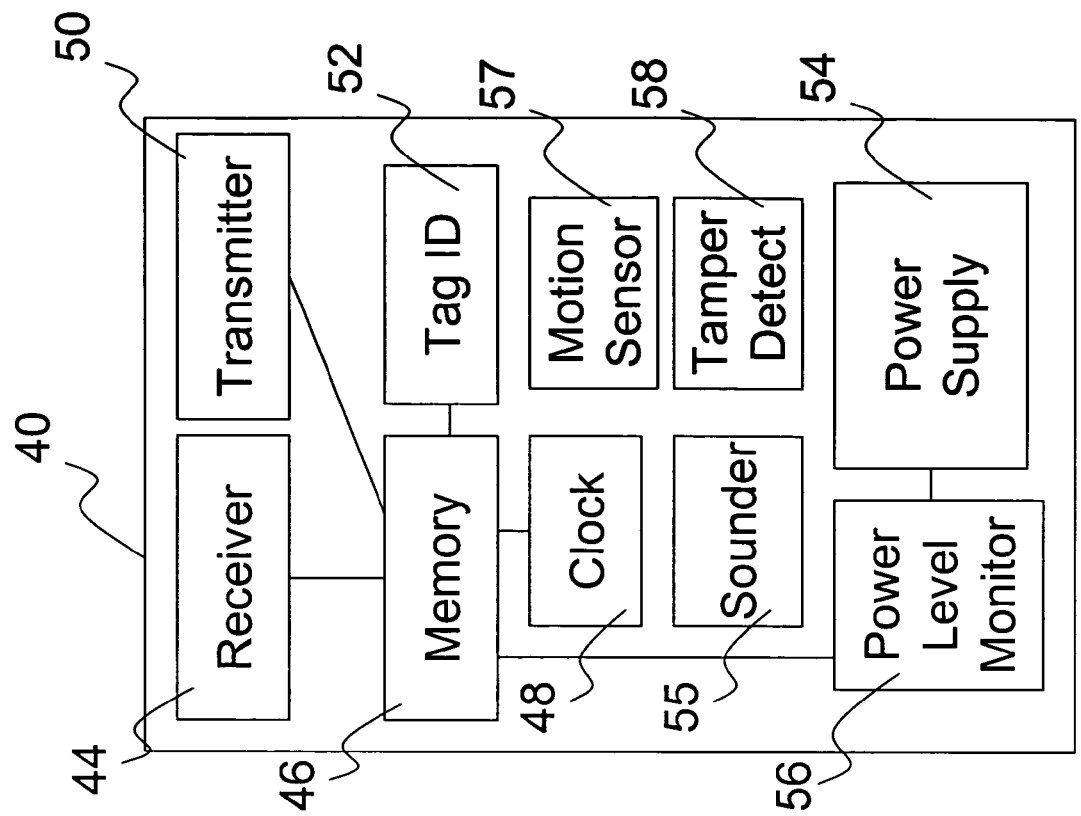
FIG. 4 is a block diagram of the components of an asset tag.

Reference is now made to FIG. 4. Asset tag 40 is located on each asset 42 that a user or facility wishes to track. Asset tag 40 preferably includes a receiver 44 for receiving a signal from location tag 20. If location tag 20 is an infrared location tag, receiver 44 will be an infrared receiver. Otherwise, receiver 44 can be designed to receive a signal from location tag 20, including controlled-range radio frequency signals.

When receiver 44 receives a signal from a location tag, this location is stored in memory 46. Memory 46 preferably only stores the most-recent location that receiver 44 received.

In the preferred embodiment, the asset tag clock (or timekeeping system) 48 measures and memory 46 records when a receiver 44 receives a signal from a different location tag. Thus, if asset tag 40 remains in the same room and continually receives the same location signal from a location tag (or doesn't approach a different location tag), only the first time the asset tag received the signal is recorded in memory 46 and the clock time of (or the duration since) this first received time is recorded. In this way, asset tag 40 can report how long it has been in the current location.

In an alternative embodiment, memory 46 and clock 48 are used to store the time that a signal was received from a location tag 20 by receiver 44. As one skilled in the art will appreciate, clock 48 can either measure real-time or lapsed time. For the lapsed time option, clock 48 can be used to measure the time elapsed since a signal was received and further when transmitting, asset tag 40 can further transmit the elapsed clock time. The time since receiver 44 most-recently received a signal from a location tag can therefore be reported.

Asset tag 40 further includes a transmitter 50 for transmitting a unique tag identifier 52 along with a location stored in memory 46. Unique tag identifier 52 can be pre-set at the factory or can be programmed by a user and is associated with a specific asset in a database to which the asset tag 40 is affixed.

Power is supplied to asset tag 40 through a power supply 54 which, in a preferred embodiment, is a battery. However, other embodiments could include receiving power from the asset 42 to which asset tag 40 is connected, photocells, or other power supplies known to those skilled in the art.

Preferably, asset tag 40 further includes a power level monitor 56 to monitor the level of power supply 54. In the case of batteries, this is preferably done in order to signal to a user when the battery level is becoming low for asset tag 40.

In operation, asset tag 40 also receives a signal from a location tag and stores the location information in this signal in memory 46. If the location has changed, the clock 48 begins measuring elapsed time, regularly updating this information in memory 46 as well. The elapsed time can be stored in memory as an exact value or, in applications where the number of bits that can be transmitted is limited, a logarithmic scale can be used to store the elapsed time. The contents of memory 46, along with the unique tag identifier 52, are transmitted using transmitter 50. Transmitter 50 is preferably a radio-frequency transmitter but other transmitters will be known to those skilled in the art.

Transmitter 50 can further transmit the power level or, in an alternative embodiment, can transmit when the power level monitor detects that the level of a battery supply is below a threshold level.

Transmitter 50 transmits periodically. This period is determined based on several competing factors. More frequent transmissions require more battery power, thus shortening battery life. Conversely, a passing asset location retrieval unit needs to be able to detect the location of an asset 42, and thus, transmitter 50 needs to transmit frequently enough that the retrieval unit will receive a signal from transmitter 50 when it passes through a receiving zone, or within communication range. Regulatory limits also impact the choice of transmit period. In one embodiment envisioned by the inventors, the location recording unit receives a signal from a transmitter 50 at least several times when passing through an area in which asset 42 is located in.

The preferred transmission rate in one embodiment is to send a signal from transmitter 50 every 10 seconds.

Further, in a preferred embodiment, each tag 40 includes dithering on the periodic transmission in order to reduce repeat collisions between asset tags that may transmit simultaneously by chance.

In further alternative embodiments, if an asset 42 has been within a specific location for an extended period, the transmission rate can be lowered. For example, if an asset 42 has been in a specific location for one week, it may be beneficial to lower the transmission rate to once every 30 seconds. This is because the asset has likely been located previously by a location retrieval unit and the asset's location recorded in a database. Since the location has not changed, it is likely worthwhile, from a battery life standpoint, to reduce the transmission rate. Such a feature also reduces radio channel utilization which can improve communications reliability. However, it is not desirable to cease transmission completely since this may indicate to a system 10 that asset 42 is lost since no asset location has been received for a specific time interval.

In a further embodiment of the present invention, asset tag 40 further includes a motion sensor 57. Motion sensor 57 can be used to control the transmit rate of transmitter 50. If an asset 42 is in motion, it is desirable that the asset tag transmits its identifier and location more frequently during the time that the asset is in motion and for a period of time after the asset ceases to be in motion. After this, the asset can revert to a lower transmission rate.

Asset tag 40 can further include a tamper-detection mechanism 58. Tamper-detection mechanism 58 can be used, for example, to detect when someone tries to remove asset tag 40 from asset 42 and this can be transmitted immediately and repeatedly by transmitter 50 and potentially also indicated by an audible signal generated by sounder 55.

A signal sent from transmitter 50, based on the above, will therefore preferably include a location identifier along with a duration for which the location identifier was received, and a unique tag identifier. This signal could further include a battery level (or status), either continuously or only when the battery level is low (or becoming low), and a tamper alarm if the asset tag 40 has been tampered with. As will be appreciated by one skilled in the art, at a minimum, the signal needs to contain the location identifier and asset identifier.

A processor (not shown) can be used to coordinate the receiving, storing, calculating elapsed time, and transmitting memory contents.

Figure 5:
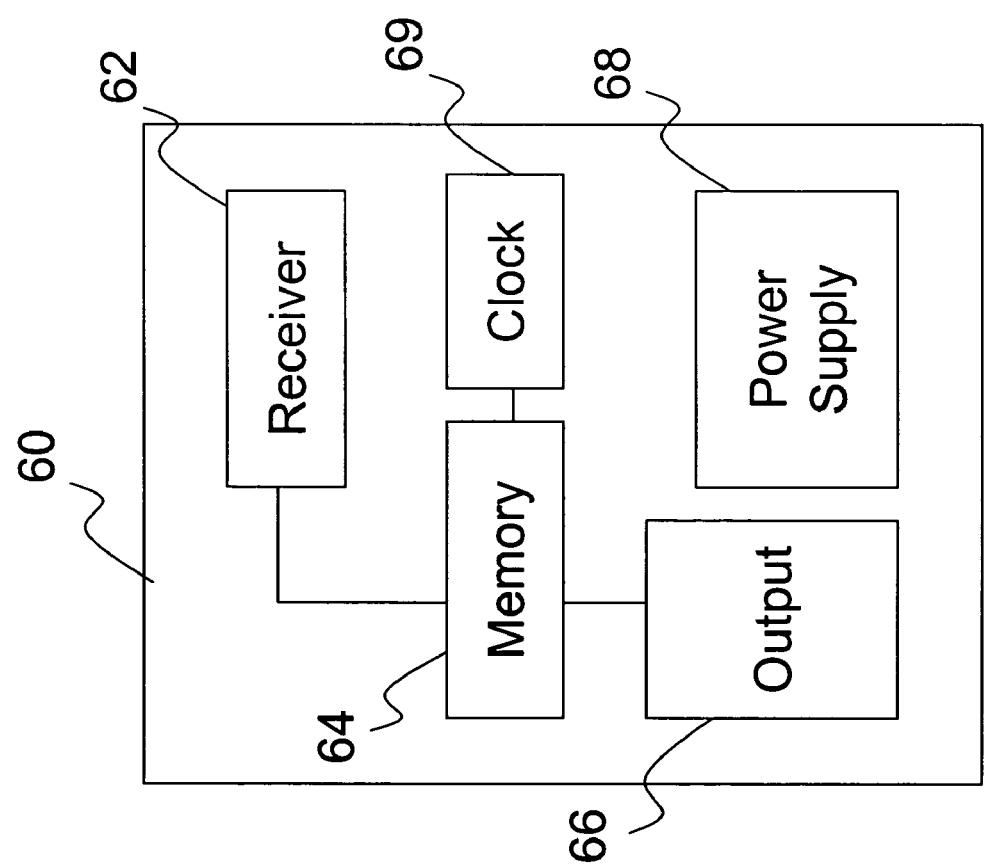
FIG. 5 is a block diagram of the components of an asset location retrieval unit.

Reference is now made to FIG. 5. At least one asset location retrieval unit 60 is periodically transported around a facility and is used to receive and record signals from asset tags. As will be appreciated by one skilled in the art, the number of asset retrieval units 60 transported around a facility will depend, among other things, on the application, size of the facility, as well as the frequency that updates for the location of assets are required. Asset location retrieval unit 60 includes a receiver 62 for receiving a signal from an asset tag. If, for example, asset tags transmit using radio frequency, receiver 62 is a radio frequency receiver.

Once a signal is received by receiver 62, the received signal, its location and other information within the signal are stored in memory 64. Memory 64 records all of the signals received by receiver 62 and it needs to be large enough to store all the asset tag messages received during the transportation of asset location retrieval unit 60 around the facility. Alternatively, the retrieval unit 60 may contain a processing unit to discard redundant information (or otherwise process received data) thereby limiting the necessary capacity of the unit's memory 64.

Asset location retrieval unit 60 further includes an output means 66 used to transfer data stored within memory 64 to a computer system. Such an output means could include a standard serial connector for dumping the data within memory 64. Other output means could include wireless transfer including iRDA, Bluetooth or WiFi to transfer the data.

Asset location retrieval unit 60 further includes a power supply 68 used to supply power to asset location retrieval unit 60. Power supply 68 is preferably an internal battery pack but it could include other power sources including photocells, external power from the trolley that asset location retrieval unit 60 is associated with.

In a preferred embodiment, asset location retrieval unit 60 is merely a collector of data. It is affixed to a cart, or trolley 70, and is transported around a facility after which it is connected to a computer system and the information stored within memory 64 downloaded. Alternatively, the asset location retrieval unit 60 could be transported by a person who makes regular rounds of the facility.

Asset location retrieval unit 60 may further include a clock 69 to timestamp incoming signals. This timestamp may be used to determine the most recent signal received from asset tag 40 and discard any other signals for that asset tag stored in memory 64.

In an alternative embodiment, asset location retrieval unit 60 can be associated with a portable computer. In this case, signals received by receiver 62 can be output immediately by output 66 to the portable computer in order to provide the portable computer with a location of assets. This allows, for example, a location device to be transported around a facility which emits a visual or audible signal when a specific asset (or member of a class of assets) is located. One skilled in the art will realize that instead of a portable computer, asset location retrieval unit 60 can include various input and output means in order to make it a more intelligent device, including personal data assistant functionality.

Figure 6:
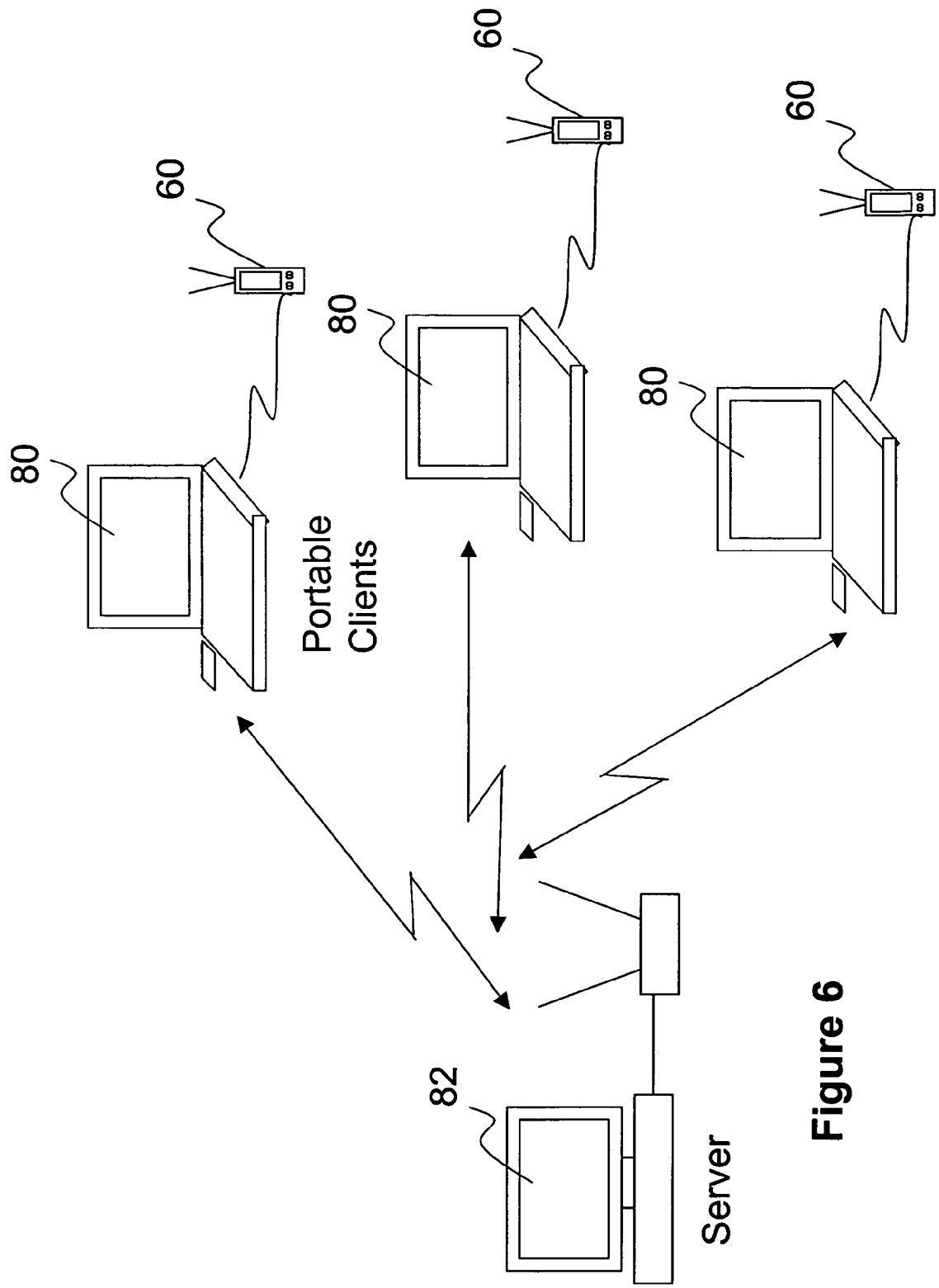
FIG. 6 is a block diagram of a client/server system according to the present invention.

Reference is now made to FIG. 6. When asset location retrieval unit 60 is returned to its original starting point or is brought to a pre-determined location, it can be connected to a computer through its output 66 in order to download the data in its memory 64. The computer can either be a stand-alone machine or, as FIG. 6 portrays, a client 80 or a server 82 operating within a network. Networking systems are well known in the art and can either be wireless, using WiFi technology or wired networks. The data, if downloaded to a client 80, is transmitted to a server 82 and can then be accessed from any other client 80 by an individual with the correct permission.

Preferably, server 82 includes a searchable database and stores the information about all of the assets within the system. This can include the location of each asset, the time the asset arrived at its location, the last time the asset was detected by asset location retrieval unit 60. In order to make searching more user-friendly, each device can further have a description associated with its identifier and the database can further include a look-up to convert a unique identifier with a physical location descriptor. For example, a unique location number 1234 can be associated with room 102 or with unit 3 on floor 8.

Assets and locations can also be classified into groups and subgroups to provide additional functionality and capabilities to the data accessing system.

The database can be further used for system maintenance by checking the battery status of both the location tags 20 and the asset tags 40 and replacing those batteries that have been indicated to be low or becoming low.

The above system, therefore, overcomes the deficiencies of prior art by providing a system in which a location tag transmits a local, unique identifier which is received by an asset tag and stored by that asset tag. The asset further transmits its unique identifier along with its present location to a location retrieval unit which is periodically transported around a facility. This location retrieval unit can download the information received to a database for searching.

The costs for implement the system are low relative to asset tracking systems. The location tags are battery-operated and can be affixed without having to modify a facility or add wiring to the facility. Each location tag transmits only within a well-controlled area preferably and can, therefore, be isolated easily from other location tags. Further, by having the asset tag receive the location rather than the location retrieval unit, a precise location can be determined. Also, since the asset tag stores its location, no computationally-expensive synchronization and triangulation is required to be performed.

The above system allows for both worker time to be saved and the productivity of an asset to be increased by reducing the amount of time it takes to retrieve an asset and, further, by ensuring that an asset is utilized a higher percentage of the time.

As will be appreciated by one skilled in the art, the present system can be implemented in hybrid situations in which certain areas have asset tracking while others have an asset location system. For example, when an asset with asset tag is moved into certain parts of the building, it receives information from a location tag, as described above, and transmits its location and asset identifiers periodically to be picked up by asset location retrieval unit 60. In other parts of the facility, a receiver can be continually communicating with server 82 and thus act more like an asset tracking-type system.

A hybrid system, as described above can, for example, be implemented to provide a security system features in a facility. For example, all of the entrances and exits of the facility can have receivers communicating with server 82. If an asset with asset tag is transported out the facility and past one of these receivers, server 82 will detect this immediately and an alarm can be raised. As will be appreciated by those skilled in the art, other situations in which a hybrid situation is needed can also be implemented.

The above described embodiments are meant to be illustrative of preferred embodiments and are not intended to limit the scope of the present invention. Also, various modifications, which would readily be apparent to one skilled in the art, are intended to be within the scope of the present invention. The only limitations to the scope of the present invention are set forth in the following claims.

We claim:

1. An asset location system comprising:
   (a) a plurality of location tags, each of said plurality of location tags having a location tag transmitter for transmission of a location identifier;
   (b) a plurality of asset tags, each of said plurality of asset tags being affixed to an asset and each of said plurality of asset tags having:
      i. an asset tag receiver for receiving a location identifier from any of said plurality of location tags;
      ii. a memory for storing at least an asset identifier and a location identifier received by said asset tag receiver; and
      iii. an asset tag transmitter for transmitting an asset signal, said asset signal including at least said asset identifier and said received location identifier; and
   (c) an asset location retrieval unit, said retrieval unit having:
      i. a retrieval unit receiver for receiving said asset signal from any of said plurality of asset tags;
      ii. a memory for storing any said received asset signal received from any of said plurality of asset tags;
      iii. a retrieval unit power unit for providing power to said retrieval unit; and
      iv. an output means for outputting asset locations based on said received asset signal from any of said plurality of asset tags.

2. The asset location system of claim 1, wherein said asset location retrieval unit is portable.

3. The asset location system of claim 2, wherein said asset location retrieval unit is periodically transported about a facility within which said asset tags are dispersed to collect the asset location information.

4. The asset location system of claim 1, wherein said asset location system includes a plurality of asset location retrieval units.

5. The asset location system of claim 4, wherein at least one of the plurality of asset location retrieval units is in a fixed location.

6. The asset location system of claim 1, wherein said location tag transmitter is an infrared transmitter or a controlled-range radio frequency transmitter.

7. The asset location system of claim 1, wherein said asset tag transmitter is a radio frequency transmitter.

8. The asset location system of claim 1, wherein said asset tag further includes a clock or timekeeping system.

9. The asset location system of claim 8, wherein said memory further stores a duration said received location identifier has remained the same.

10. The asset location system of claim 9, wherein said asset tag transmitter also transmits said duration.

11. The asset location system of claim 1, wherein said asset tag has a power unit.

12. The asset location system of claim 11, wherein said asset tag power unit includes batteries.

13. The asset location system of claim 12, wherein said asset tag further includes a battery level monitor to determine an asset tag battery status.

14. The asset location system of claim 13, wherein said asset tag transmitter also transmits said asset tag battery status.

15. The asset location system of claim 1, wherein said location tag has a power unit.

16. The asset location system of claim 15, wherein said location tag power unit includes batteries.

17. The asset location system of claim 16, wherein said location tag further includes a battery level monitor to determine a location tag battery status.

18. The asset location system of claim 17, wherein said location tag transmitter further transmits said location tag battery status.

19. The asset location system of claim 18, wherein said asset tag receiver receives said location tag battery status, said asset tag memory stores said location tag battery status, and said asset tag transmitter also transmits said location tag battery status.

20. The asset location system of claim 1, wherein said asset tag further includes a tamper detection means.

21. The asset location system of claim 20, wherein said asset tag transmitter also transmits a status of said tamper detection means.

22. The asset location system of claim 1 further comprising a server with a database.

23. The asset location system of claim 22, wherein said output means includes a connection for downloading said received asset signal from any of said plurality of asset tags to said server database.

24. The asset location system of claim 23, wherein an asset can be located by searching said server database.

25. The asset location system of claim 22, wherein said system further comprises at least one client machine communicating with said server.

26. The asset location system of claim 25, wherein said connection on said output means of said asset location retrieval unit can be connected to said client.

27. The asset location system of claim 1, wherein said output means of said asset location retrieval unit includes a display for displaying asset locations.

28. The asset location system of claim 27, wherein said retrieval unit further includes an indicator to signal when an asset signal is received from one of said plurality of asset tags.

* * * * *